H. V. WELCH.
METHOD OF CONCENTRATING SOLUTIONS.
APPLICATION FILED MAY 10, 1917.
1,289,984.
Patented Dec. 31, 1918.
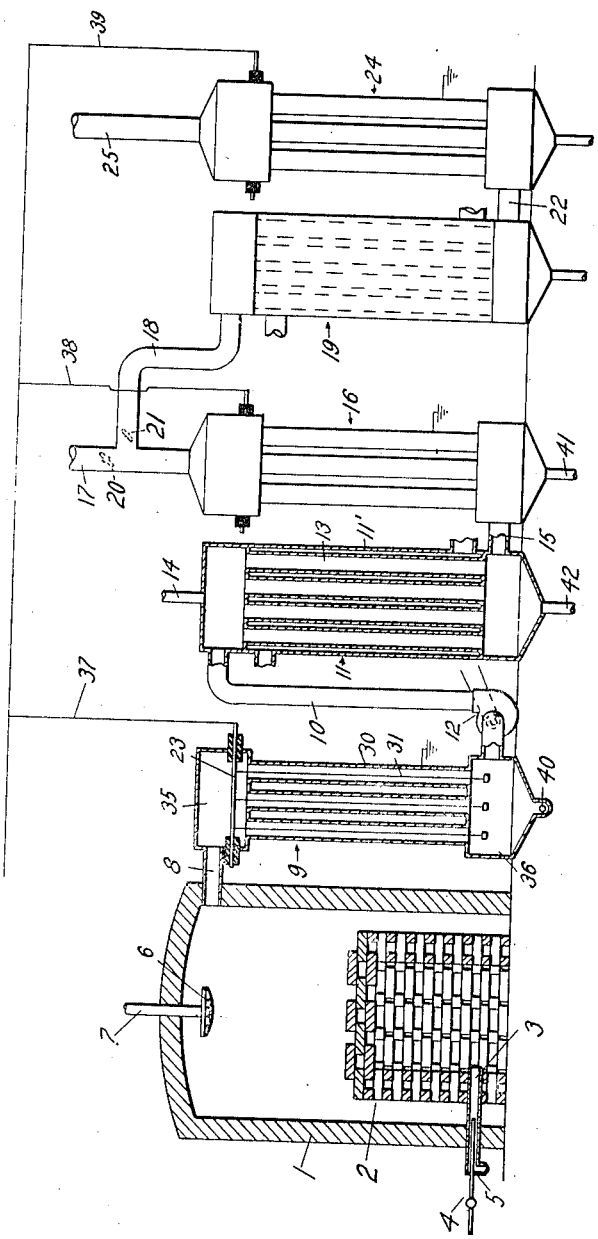
Inventor:
Harry V. Welch
by Arthur P. Knight.
his Attorney.

UNITED STATES PATENT OFFICE.

HARRY V. WELCH, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA.

METHOD OF CONCENTRATING SOLUTIONS.

1,289,984.  Specification of Letters Patent.  Patented Dec. 31, 1918.

Application filed May 10, 1917. Serial No. 167,731.

*To all whom it may concern:*

Be it known that I, HARRY V. WELCH, a citizen of the United States, residing at Los Angeles, in the county of Los Angeles and State of California, have invented a new and useful Method of Concentrating Solutions, of which the following is a specification.

This invention relates to the concentration of dilute acids or other solutions, and the main object of the invention it to provide for concentrating such solutions with great rapidity and economy of operation.

In the arts and industries, there are produced in many processes, large quantities of solutions containing useful and valuable substances, but in so dilute a form as to be of little if any commercial value. As an illustration of such a condition may be mentioned the dilute sulfuric acid resulting from the manufacture of nitroglycerin and nitrocellulose, and in fact, from the many chemical reactions wherein concentrated sulfuric acid is used to withdraw the water produced in the reaction. Another illustration is the dilute chamber acid produced in the chamber process of sulfuric acid manufacture, requiring, in general, further concentration to make it commercially available.

I have found that such solutions including dilute sulfuric acid may be concentrated in an extremely rapid and economical manner by converting all the liquid into the gaseous phase, by the action of heat, and then cooling the material sufficiently to produce a fume of acid of the required strength, the fume of acid being then precipitated and collected, preferably by electrical action.

My process has advantages of economy due to effective utilization of the heat supplied, the simplicity and cheapness of construction of the apparatus required, and the small floor space needed therefor. It also presents the advantage of enabling concentration to a given strength with great accuracy.

The accompanying drawing is a diagrammatic vertical section of an apparatus suitable for carrying out my invention.

The apparatus shown in the drawing comprises a heating or evaporating chamber 1, which may be formed as a tower containing checker work, or similar material 2, adapted to receive and retain the heat, said chamber being provided with suitable means for supplying heat thereto; for example, a burner 3 provided with means 4 and 5 for regulating the admission of fuel and air. If desired, however, this heating or evaporating chamber may be of the muffle fired type adapted to be heated externally. Suitable means, such as nozzle 6, is provided for supplying to the interior of the chamber the solution to be concentrated, said solution being supplied through a pipe 7 leading from any suitable source of supply. The outlet 8 of the chamber 1 is connected to suitable cooling means for condensing the vapor produced in the heating chamber 1. In case it is desired to subject the vapor to a preliminary cleaning action before condensation so as to remove therefrom any suspended solid or liquid matter carried over from the heating chamber, a precipitating means such as electrical precipitator 9 may be included in the connection between the outlet 8 of chamber 1 and the inlet pipe 10 of the cooler 11. A fan or blower 12 is shown in the connection between the precipitator 9 and the cooler 11, to produce a forced draft, if such is required. The cooler 11 may be of any suitable type comprising, for example, flues 13 through which the vapors pass and which are cooled by air circulating in casing 11', and if desired, an air inlet 14 may be provided for admitting more or less cold air to the vapor to assist in cooling the same. From cooler 11, a pipe 15 leads to a separating apparatus, preferably an electrical precipitator 16. The outlet of this electrical precipitator is shown as connected to a stack 17 and also to the inlet pipe 18 for a second cooler 19, valves or dampers 20 and 21 being provided respectively in these connections. The outlet pipe 22 of the second cooler is connected to a separating apparatus 24, preferably an electrical precipitator. The outlet pipe 25 of said electrical precipitator is shown as connected to an outlet stack or flue 26. The cooler 19 may be similar to the cooler 11.

The electrical precipitators 9, 16 and 24 may be of any suitable construction, being provided, for example, with collecting electrodes 30 formed as vertical flues and with discharge electrodes 31 formed as wires hung axially in said flues and suspended from insulated supports 23, the said vertical flues 30 being connected at their upper and lower ends to headers 35 and 36 for distributing the gas to said flues. The insulated high tension electrodes may be connected by wires indicated at 37, 38 and 39 to any suitable source of high tension current, preferably unidirectional; for example, in the manner shown in patent to F. G. Cottrell, No. 895,729. dated August 11, 1908.

My process may be carried out in the above described apparatus as follows:

The solution to be concentrated—for example, dilute sulfuric acid, is supplied through pipe 7 and nozzle 6 and sprayed into the chamber 1, wherein it is brought in contact with the hot walls and checker work at high temperature, and with the hot gases therein, produced by operation of the burner 3, sufficient heat being thereby supplied to the solution to completely evaporate the same. The resulting vapor, together with more or less of the gases produced in, or admitted to, the chamber 1, is drawn through outlet pipe 8 and if the precipitator 9 is used, is subjected in such precipitator to the action of an electrical field in such manner as to remove therefrom any suspended material, either solid or liquid, drawn over with the vapor from the chamber 1, the material so separated being removed from the precipitator 9 in any suitable manner; for example, by discharging means indicated at 40. The vapor and gases pass to the cooler 11 from the precipitator 9, or directly from the chamber 1, as the case may be, and in such cooler 11, sufficient heat is withdrawn from the vapor to cause the same to condense in the form of a fume or cloud or suspended particles, the concentration of which depends on the temperature and other conditions maintained in the cooler, so that by maintaining a definite condition of temperature and pressure within the cooler and by suitably regulating the amount of gases admitted so as to maintain the partial pressure of the vapor within definite limits, the required concentration of the liquid in the resulting fume may be secured within any desired limits. The gases containing the resulting fume or cloud pass through outlet pipe 15 to the electrical precipitator 16, wherein the fume or cloud is precipitated by electrical action and the resulting concentrated solution collects in the lower header of the precipitator and may be drawn off through outlet means indicated at 41. Any liquid that may collect in the cooler 11 may also be drawn off through outlet means indicated at 42. In some cases, by suitably maintaining the conditions of pressure and temperature in the cooler and precipitator with respect to the temperature in the evaporator 1, it is possible to insure that the vapor passing off from the precipitator 16 will consist substantially of water, for example, the acid or other solution of required concentration being collected at the same time in said precipitator. In such case, the residual gas and vapor may be discharged directly to the stack 17. For example, I have found by experiment that the relative amount of sulfuric acid to water leaving the surface of a boiling acid bath in gaseous phase up to a temperature of at least 200° C. and apparently to a considerable higher temperature, is infinitesimally small. So that if, for example, sulfuric acid of 80% strength is required to be produced from dilute sulfuric acid, the acid may first be heated about 300° C. in the chamber 1 and the vapor then cooled to about 200° C. in the cooler 11, the same temperature being maintained in the precipitator 16 and with such operation, the liquid will be completely converted to the gases formed in the heater 1, and the fume or cloud of liquid particles formed in the cooler 11 will consist of acid of about 80% strength, and the remaining vapor will be substantially free from sulfuric acid and may be discharged without loss. In case, however, an acid of greater concentration is required, it is necessary to maintain a higher temperature in the cooler and in some cases, this will involve the presence of considerable acid in the residual vapor passing from the precipitator. In such cases, the gas and vapor passing from the precipitator 16 may be directed through the second cooler 19 to produce a second fume or cloud of liquid particles at a lower temperature, this fume or cloud being then precipitated in the second precipitator 24. In this manner, any desired number of fractional precipitations may be provided for so as to give a plurality of fractions of different concentration. The temperature of the gases entering and passing through the precipitation chamber or chambers is, in each case, carefully regulated by means of air drafts, fuel consumption and amount of acid spray supplied to the evaporating chamber so that the acid condensing from the gaseous phase and forming the mist or cloud to be precipitated may be of the concentration desired—say, for example, roughly 260° ± 10° C. for 90% acid; 205° ± 5° C. for 80% acid; 170 ± 5° C. for 70% acid, etc. With complete electrical clearance, the gases leaving the electrical precipitation chamber carry no solids or liquids in suspension and carry in gaseous or vapor form, all the excess water derived from the dilute acid, as well as possible small percentages of acid in some cases.

In applying my invention to the production of acid of high concentration—say, 90% acid, it is advantageous to first convert all of the dilute acid solution to the gaseous phase, then to cool say, to about 260° C. and precipitate the resulting mist so as to collect an acid of 90% strength and then further cool the residual gases and vapors to say about 170° C. so as to collect an acid of about 70% strength, the residual gas and vapor then containing substantially no acid and being discharged into the stack without waste.

It will be understood that my process is applicable to the concentration of any solution and especially to solutions consisting of mixtures of different boiling points and capable of fractional condensation in the form of fume or mist in the manner stated.

In some cases, it may not be necessary to convert all of the original solution to the form of vapor. For example, in case of a solution containing sulfuric acid and impurities such as ferrous sulfate, or other salts, the evaporation in the vaporizing chamber may be carried on in such manner that a vapor containing sulfuric acid and water passes off and a residue containing the said salts remains in the vaporizing chamber and is drawn off continuously or from time to time. The vapors of acid and water passing off are then subjected to the cooling and precipitating actions as above described, to produce a relatively concentrated solution.

In some cases also, there may be more or less solid or liquid material carried over from the vaporizing chamber, consisting, for example, of spray particles from which water has been more or less evaporated. In such cases, it is desirable to subject the gases passing over from the vaporizing chamber to precipitating action, for example, in a precipitator similar to that shown, for removing all such suspended matter before the vapors are condensed to form the concentrated product.

My process may also be applied to separation of more than two vaporized constituents of a liquid. For example, a solution containing hydrochloric acid, sulfuric acid, together with water, (resulting from the reaction of chlorin, sulfur dioxid and water, as set forth in an application filed by me of even date herewith), may be subjected to sufficient heat to volatilize all of the vaporizable constituents of the liquid, and then cooled sufficiently to condense the sulfuric acid of any desired concentration, to the form of a cloud which is then precipitated by electrical action; the remaining gases and vapors being then further cooled to condense hydrochloric acid as a fume, the latter being then precipitated.

What I claim is:

1. The process of concentrating a solution which consists in converting substantially all of said solution to gaseous form by the action of heat, then cooling the resulting gases and vapors to a definite temperature to produce a mist or fume of particles of solution of definite concentration greater than that of the original solution and then precipitating such fume or mist to collect a concentrated solution.

2. The process of concentrating a solution which consists in supplying sufficient heat thereto to convert the same to the form of vapor, then cooling such vapor to a definite temperature so as to form a condensed mist or fume of definite concentration and containing a part only of the original solution and then precipitating the resulting mist or fume by electrical action so as to collect a concentrate of higher concentration than the original solution.

3. The process of concentrating a solution which consists in converting such solution by the action of heat to the form of vapor, cooling such vapor in a series of stages to successive definite temperatures to produce fumes or mists of different concentration and precipitating the fume or mist produced at each condensation to collect fractions of different concentration.

4. The process of concentrating sulfuric acid which consists in supplying sufficient heat to dilute sulfuric acid to vaporize the sulfuric acid component thereof, then cooling the resulting vapor to a temperature which is slightly below the maximum boiling point for sulfuric acid so as to produce a fume or mist of sulfuric acid of high concentration, collecting such fume or mist by precipitating the same and then further cooling the residual vapor to a lower temperature at which substantially all of the sulfuric acid is condensed in the form of mist, the residual vapor from said last condensation consisting substantially of water, and precipitating said second fume or mist to collect an acid of the lower concentration than the first precipitate but of higher concentration than the original dilute acid.

5. The process of concentrating solutions which consists in spraying such solutions into gases heated by products of combustion, to a sufficient temperature to volatilize such solution, subjecting the resulting gases and vapors to precipitating action to separate therefrom any material not in a gaseous phase, cooling the resulting gases and vapors to such temperature as to condense fume or mist of relatively concentrated acid and precipitating such fume or mist to collect such concentrated acid.

6. The process of producing a concentrated solution from a comparatively dilute solution which consists in subjecting said solution to heat to produce a vapor containing the material to be concentrated, cooling the resulting vapor sufficiently to produce a mist containing only the more condensable part of the original solution, and precipitating such mist to collect a concentrated solution.

7. The process of concentrating a solution containing a plurality of vaporizable constituents, which consists in vaporizing said constituents, then cooling the resulting vapor mixture to produce suspended particles of definite concentration of one of said constituents, and precipitating such suspended particles.

8. The process which consists in heating a solution containing a plurality of vaporizable constituents, to vaporize said constituents, then cooling the mixed vapors in a plurality of stages to produce clouds of suspended particles containing the respective said constituents, and precipitating the cloud formed at each stage of cooling.

In testimony whereof I have hereunto set my hand, at Los Angeles, California, this 5th day of May, 1917.

HARRY V. WELCH.